United States Patent
Zhao et al.

(10) Patent No.: US 9,420,635 B2
(45) Date of Patent: Aug. 16, 2016

(54) IN-DEVICE COEXISTENCE OF WIRELESS COMMUNICATION TECHNOLOGIES

(71) Applicant: MARVELL WORLD TRADE LTD., St. Michael (BB)

(72) Inventors: Qing Zhao, Milpitas, CA (US); Yakun Sun, Sunnyvale, CA (US); Yi-Ling Chao, Sunnyvale, CA (US); Leilei Song, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 30 days.

(21) Appl. No.: 14/218,876

(22) Filed: Mar. 18, 2014

(65) Prior Publication Data

US 2014/0274202 A1    Sep. 18, 2014

Related U.S. Application Data

(60) Provisional application No. 61/802,901, filed on Mar. 18, 2013.

(51) Int. Cl.
| | |
|---|---|
| *H04M 1/00* | (2006.01) |
| *H04W 88/06* | (2009.01) |
| *H04L 1/00* | (2006.01) |
| *H04W 72/12* | (2009.01) |

(52) U.S. Cl.
CPC .............. *H04W 88/06* (2013.01); *H04L 1/0026* (2013.01); *H04W 72/1215* (2013.01); *H04W 72/1226* (2013.01)

(58) Field of Classification Search
CPC ......... H04L 45/16; H04L 12/18; H04L 45/52; H04L 69/08; H04L 12/4625; H04L 41/028; H04L 41/28; H04L 41/5019; H04L 43/0817; H04L 45/04; H04L 45/42; H04L 47/10; H04L 47/2475
USPC ...................................... 455/552.1
See application file for complete search history.

(56) References Cited

U.S. PATENT DOCUMENTS

| | | | |
|---|---|---|---|
| 6,614,797 B1 | 9/2003 | Hippelainen | |
| 7,215,659 B1 | 5/2007 | Chen et al. | |
| 7,277,692 B1 | 10/2007 | Jones et al. | |

(Continued)

OTHER PUBLICATIONS

"Technical White Paper: Long Term Evolution (LTE): A Technical Overview", Motorola, 2007, 15 pages.

(Continued)

*Primary Examiner* — Ajibola Akinyemi

(57) ABSTRACT

In a method of operating a communication device that includes at least (i) a first network interface configured to operate according to a first communication protocol and (ii) a second network interface configured to operate according to a second communication protocol, the first communication interface is operated according to the first communication protocol. The first communication protocol defines a periodically repeating set of time intervals. One or more time intervals, from the set of time intervals, that meet a selection criteria are determined. The selection criteria is based on level of interference experienced by the first network interface. During the determined one or more time intervals, operation of the first network interface according to the first communication protocol is suspended, and operation of the second network interface according to the second communication protocol is enabled.

20 Claims, 4 Drawing Sheets

(56) References Cited

U.S. PATENT DOCUMENTS

| | | | |
|---|---|---|---|
| 8,094,597 | B1 | 1/2012 | Chhabra et al. |
| 8,155,138 | B2 | 4/2012 | van Nee |
| 8,526,351 | B2 | 9/2013 | Fischer et al. |
| 8,705,427 | B1 | 4/2014 | Chhabra et al. |
| 8,724,720 | B2 | 5/2014 | Srinivasa et al. |
| 2002/0136233 | A1 | 9/2002 | Chen et al. |
| 2002/0181492 | A1 | 12/2002 | Kasami et al. |
| 2003/0093513 | A1 | 5/2003 | Hicks et al. |
| 2005/0059347 | A1 | 3/2005 | Haartsen |
| 2008/0279163 | A1 | 11/2008 | Desai |
| 2009/0059826 | A1* | 3/2009 | Zhao .............. H04W 52/0241 370/311 |
| 2009/0196163 | A1 | 8/2009 | Du |
| 2011/0002219 | A1 | 1/2011 | Kim et al. |
| 2012/0164948 | A1* | 6/2012 | Narasimha ....... H04W 72/1215 455/63.1 |
| 2013/0155931 | A1* | 6/2013 | Prajapati ............ H04W 72/044 370/311 |

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.

3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), Dec. 2011, 125 pages.

3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), Mar. 2012, 125 pages.

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010, 149 pages.

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.

3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", Dec. 2010, 32 pages.

3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", Dec. 2010, 42 pages.

3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", Dec. 2010, 297 pages.

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 0)", Dec. 2011, 296 pages.

3GPP TS 23.203 V10.6.0, "3rd Generation Partnership Project; Technical Specification Group Services and System Aspects; Policy and Charging Control Architecture (Release 10)", Mar. 2012, 131 pages.

3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", Dec. 2011, 44 pages.

Yuan et al., "Carrier Aggregation for LTE-Advanced Mobile Communication Systems," IEEE Communications Magazine, pp. 88-93, Feb. 2010.

Wannstrom, "Carrier Aggregation explained," pp. 1-6 May 2012.

Trill: Fine-Grained Labeling, Internet-Draft, Eastlake et al., Dec. 8, 2011, 21 pages.

Pedersen et al., "Carrier Aggregation for LTE-Advanced: Functionality and Performance Aspects," IEEE Communications Magazine, vol. 49, No. 6, pp. 89-95, Jun. 1, 2011.

International Search Report and Written Opinion for International Application No. PCT/US2014/031122, mailed Jun. 26, 2014.

"Text Proposal to 36.816 for TDM Solution," Motorola Mobility, document R2-113243, 3GPP TSG-RAN WG2#74, Barcelona, Spain May 9-13, 2011.

"Analysis of RRM requirements," Ericsson/ST-Ericsson, document R4-125803, 3GPP TSG-RAN WG4 Meeting #64bis, Santa Rosa, CA, Oct. 8-12, 2012.

"Further discussion on the HARQ process reservation based solution," ZTE, document R2-111912, 3GPP TSG-RAN WG2 Meeting #73bis, Shanghai, China, Apr. 11-15, 2011.

U.S. Appl. No. 12/260,867, Chhabra et al., "Method and Apparatus for Coexistent WLAN and PAN Communication with Intelligent PAN Slot Suppression," filed Oct. 29, 2008.

U.S. Appl. No. 12/260,875, Chhabra et al., "Method and Apparatus for Coexistent Wireless and Bluetooth Communication Using Power Sae Polling," filed Oct. 29, 2008.

U.S. Appl. No. 12/260,995, Chhabra et al., "Method and Apparatus for Using Power Management Mode to Regulate Data Transmission when a Bluetooth Network and a Wireless Local Area Network Coexist," filed Oct. 29, 2008.

U.S. Appl. No. 14/256,388, Chhabra et al., "Method and Apparatus for Maintaining a Wireless Local Area Network Connection During a Bluetooth Inquiry Phase or a Bluetooth Paging Phase," filed Apr. 18, 2014.

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput", The Institute of Electrical and Electronics Engineers, Inc., pp. 1-544 (Sep. 2007).

IEEE Std. 802.11™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," *The Institute of Electrical and Electronics Engineers, Inc.*, pp. 1-456 (Sep. 2013).
Chen, "Home Network Basis: Transmission Environments and Wired/Wireless Protocols," *Prentice Hall*, pp. 1-26 (Jul. 2003).
Golmie et al., "Bluetooth and WLAN Coexistence: Challenges and Solutions," IEEE Wireless Comm., vol. 10, No. 6, pp. 22-29, (2003).
Hiertz et al., "The IEEE 802.11 Universe," *IEEE Communications Magazine*, pp. 62-70, (Jan. 2010).
"How 802.11 b/g Wireless WLAN and Bluetooth Can Play; Without Standards-Based Solutions, ICs Must Referee Spectrum Rivalry," Philips Electronics, dated Sep. 2005, 5 pages.
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Quinnell, "WiFi and Bluetooth Fight for Bandwidth," EDN, dated Aug. 4, 2005, 4 pages.
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).
van Nee et al., "The 802.11n MIMO-OFDM Standard for Wireless LAN and Beyond," Wireless Personal Communications, vol. 37, pp. 445-453 (Jun. 2006).
"WiFi™ and Bluetooth™—Interference Issues," HP, dated Jan. 2002, 6 pages.
Wojtiuk, "Bluetooth and WiFi Integration: Solving Co-Existence Challenges," RF Design, dated Oct. 2004, 4 pages.
Non-Final Office Action for U.S. Appl. No. 12/260,867, mailed Sep. 7, 2011.
Final Office Action for U.S. Appl. No. 12/260,867 mailed Mar. 12, 2012.
Non-Final Office Action for U.S. Appl. No. 12/260,867, mailed Aug. 9, 2012.
Final Office Action for U.S. Appl. No. 12/260,867 mailed, Mar. 4, 2013.
Non-Final Office Action for U.S. Appl. No. 12/260,867, mailed Jul. 3, 2013.
Final Office Action in U.S. Appl. No. 12/260,867, dated Feb. 3, 2014 (24 pages).
Examiner's Answer to Appeal Brief in U.S. Appl. No. 12/260,867, dated Nov. 5, 2014 (19 pages).
U.S. Appl. No. 12/260,875, Chhabra et al., "Method and Apparatus for Coexistent Wireless and Bluetooth Communication Using Power Save Polling," filed Oct. 29, 2008.
Non-Final Office Action for U.S. Appl. No. 12/260,875, mailed, Sep. 15, 2011.
Final Office Action for U.S. Appl. No. 12/260,875, mailed Mar. 29, 2012.
Non-Final Office Action for U.S. Appl. No. 12/260,875, mailed, Jun. 4, 2013.
Final Office Action for U.S. Appl. No. 12/260,875, mailed Oct. 22, 2013.
Examiner's Answer to Appeal Brief in U.S. Appl. No. 12/260,875, dated Aug. 6, 2014 (18 pages).
Non-Final Office Action for U.S. Appl. No. 12/260,995, mailed Sep. 15, 2011.
Final Office Action for U.S. Appl. No. 12/260,995, mailed Mar. 1, 2012.
Non-Final Office Action for U.S. Appl. No. 12/260,995, mailed Aug. 31, 2012.
Final Office Action for U.S. Appl. No. 12/260,995, mailed Mar. 5, 2013.
Non-Final Office Action for U.S. Appl. No. 12/260,995, mailed Jul. 3, 2013.
Examiner's Answer to Appeal Brief in U.S. Appl. No. 12/260,995, dated Nov. 4, 2014 (19 pages).
International Preliminary Report on Patentability in International Application No. PCT/US2014/031122, dated Sep. 22, 2015 (9 pages).

\* cited by examiner

IN-DEVICE COEXISTENCE OF WIRELESS COMMUNICATION TECHNOLOGIES

CROSS-REFERENCE TO RELATED APPLICATIONS

This disclosure claims the benefit of U.S. Provisional Patent Application No. 61/802,901, filed Mar. 18, 2013, entitled "Puncture of Interfered Subframes to Facilitate IDC," the disclosure of which is hereby expressly incorporated herein by reference in its entirety.

FIELD OF TECHNOLOGY

The present disclosure relates generally to wireless communications and, more particularly, to techniques for enabling coexistent communications using multiple wireless communication technologies within a communication device.

DESCRIPTION OF THE RELATED ART

Wireless communication networks continue to increase in demand as consumers flock toward mobile computing devices and as manufacturers continue to develop wireless devices with greater capabilities and features. Numerous types of wireless networks and network protocols exist. For example, cellular networks typically operate according to a $3^{rd}$ Partnership Project Long Term Evolution (3GPP LTE) Standard currently under development. Wireless local area networks (WLAN) typically operate according to an Electronics Engineers (IEEE) 802.11 standard wireless protocol, first promulgated in 1999. These protocols include IEEE 802.11a, 802.11b, 802.11g, 802.11n, and 802.11ac which operate at different spectrum bands and/or different multiplexing or spread spectrum schemes to deliver various bit rates to devices on a wireless network. Any of these IEEE 802.11 networks are often referred to as WiFi networks.

Wireless communication devices often employ multiple communication technologies that co-exist in the communication devices. For example, a communication device may operate in a cellular network according to a cellular network communication protocol, such as a 3GPP LTE communication protocol, and may also operate in a WLAN network according to a WLAN communication protocol, such as the IEEE 802.11n Standard or the IEEE 802.11ac Standard. In some situations, concurrent operation of multiple systems operating according to different communication protocols within a device can cause interference between the multiple systems. For example, when WLAN communication systems and 3GPP LTE communication systems coexist in sufficiently close proximity to one another within a communication device, transmissions of one system may interrupt, degrade, or otherwise interfere with reception by the other system. For example, when a 3GPP LTE transmitter is located in close proximity to a WLAN receiver, transmit power emanating from the 3GPP LTE transmitter may desensitize and possibly saturate the WLAN receiver such that, during the 3GPP transmission, a data packet being sent to the WLAN receiver by a WLAN access point, for example, either may not be received properly by the WLAN receiver or may even not be received at all.

SUMMARY OF THE DISCLOSURE

In an embodiment, a method of operating a communication device that includes at least (i) a first network interface configured to operate according to a first communication protocol and (ii) a second network interface configured to operate according to a second communication protocol. The method includes operating the first communication interface according to the first communication protocol, wherein the first communication protocol defines a periodically repeating set of time intervals. The method also includes determining one or more time intervals, from the set of time intervals, that meet a selection criteria, wherein the selection criteria is based on level of interference experienced by the first network interface. The method additionally includes, during the determined one or more time intervals, suspending operation of the first network interface according to the first communication protocol, and enabling operation of the second network interface according to the second communication protocol.

In another embodiment, an apparatus comprises a communication device having (i) a first network interface configured to operate according to a first communication protocol and (ii) a second network interface configured to operate according to a second communication protocol. The communication device is configured to operate the first communication interface according to the first communication protocol, wherein the first communication protocol defines a periodically repeating set of time intervals. The communication device is also configured to determine one or more time intervals, from the set of time intervals, that meet a criteria for a high level of interference experienced by the first network interface. The communication is additionally configured to, during the determined one or more time intervals, suspend operation of the first network interface according to the first communication protocol, and enable operation of the second network interface according to the second communication protocol.

DETAILED DESCRIPTION

Figure 1:
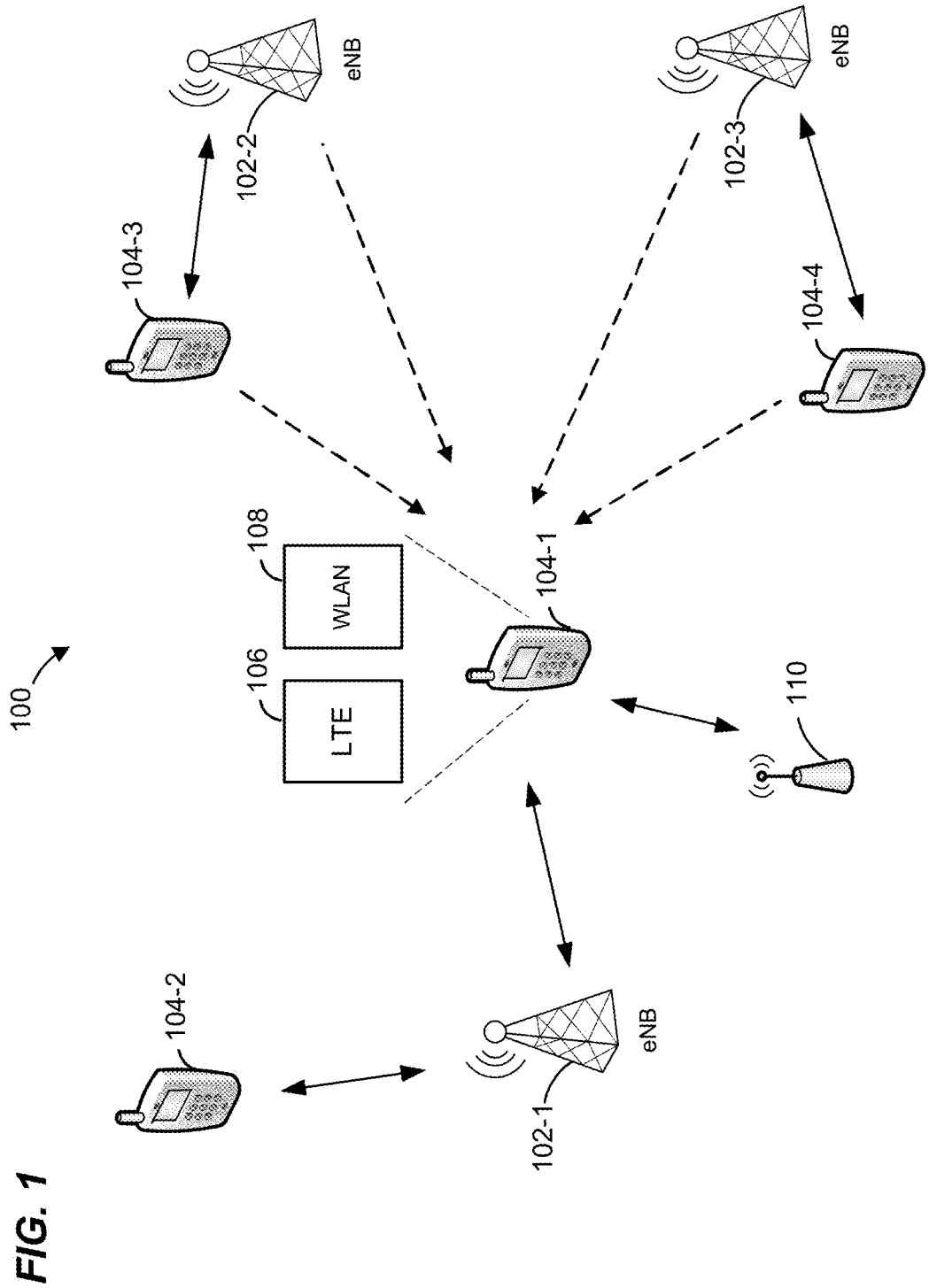
FIG. 1 is a block diagram of a communication network that utilizes in-device interference mitigation techniques of the present disclosure, according to an embodiment.

FIG. 1 is a block diagram of a communication network 100 that utilizes in-device interference mitigation techniques of the present disclosure, according to an embodiment. In an embodiment, the network 100 includes a plurality of cells served by respective base stations 102 (the cells are not depicted in FIG. 1 to avoid obscuring the figure). In an embodiment, each of the base stations 102 acts as a serving base station for one or more user devices 104 that are within the cell served by the base station 102. For example, the base station 102-1 is a serving base station for user devices 104-1 and 104-2, the base station 102-2 is a serving base station for a user device 104-3, and the base station 102-3 is a serving base station for a user device 104-4, in the illustrated embodiment. Although three base stations 102 are illustrated in FIG. 1 for clarity, the network 100 includes other suitable numbers of base stations 102, and each of the base stations 102 serves any suitable numbers of user devices 104, in various embodiments and/or scenarios.

Each of the base stations 102 and each of the user devices 104 is configured to operate according to at least a first communication protocol, in an embodiment. In an embodiment, at least one of the user devices 104 (e.g., the user device 104-1) is also configured to operate according to at least a second communication protocol. As illustrated in FIG. 1, the communication device 104-1 includes a first network interface 106 configured to operate according to the first communication protocol and a second network interface 108 configured to operate according to the second communication protocol, in the illustrated embodiment. In the embodiment of FIG. 1, the first communication protocol is a cellular network communication protocol, such as a $3^{rd}$ Generation Partnership Project Long Term Evolution (3GPP LTE) communication protocol, and the second communication protocol is a WiFi communication protocol, such as a wireless local area network (WLAN) communication protocol (e.g., the IEEE 802.11n or the IEEE 802.11ac protocol). The network device 104-1 communicates with the base station 102-1 via the first network interface 106, and communicates with a WLAN access point (AP) 110 via the second network interface 108, in the illustrated embodiment. In other embodiments, the first communication protocol and/or the second communication protocol is another suitable communication protocol, such as a Worldwide Interoperability for Microwave Access (WiMax) communication protocol, a Bluetooth communication protocol, a global system positioning (GPS) communication protocol etc. As an example, the user device 104-1 communicates with a Bluetooth device, such as a wireless headset, via the second network interface 108, in one such embodiment.

In an embodiment, the first communication protocol and the second communication protocol define operation in one or more overlapping or closely spaced frequency bands. Concurrent operation of the first network interface 106 and the second network interface 108, at least in such frequency bands, can result in interference between transmission and reception by the first network interface 106 and the second network interface 108 ("in-device interference"), for example when one of the network interfaces 106, 108 is transmitting while the other one of the network interfaces 106, 108 is receiving. As an example, wherein the first communication protocol is a 3GPP LTE communication protocol and the second communication protocol is a WLAN communication protocol, operation of the first network interface 106 in the LTE time-division duplex (TDD) Band 40 (2300 MHz to 2400 MHz) may interfere with concurrent operation of the second network interface 108 in the 2400 MHz-2480 MHz WLAN band. As another example, operation of the first network interface 106 in the LTE TDD Band 41 (2496 MHz to 2690 MHz) may interfere with concurrent operation of the second network interface 108 in the 2400 MHz-2480 MHz WLAN band. As yet another example, uplink transmissions of the first network interface 106 in LTE frequency-division duplex (FDD) Band 7 (2500 MHz to 2700 MHz) may interfere with concurrent operation of the second network interface 108 in the 2400 MHz-2480 MHz WLAN band at least with respect to uplink LTE transmissions, in an embodiment.

In an embodiment, the first communication protocol defines a periodically repeating set of time intervals for scheduling communication between base stations and user devices. In an embodiment, base stations 102 use the time intervals to schedule communication with the user devices 104 served by the base stations 102. In an embodiment, the base station 102-1 schedules communication between the base station 102-1 and the user devices 104-1, 104-2 within the periodically repeating set of time intervals. For example, the base station 102-1 schedules communication between the base station 102-1 and the user device 104-1 within one or more, but not all, of the time intervals, in an embodiment. Similarly, the base station 102-1 schedules communication between the base station 102-1 and the user device 104-2 within one or more, but not all, of the time intervals, in an embodiment. In some embodiments, the first communication protocol utilizes orthogonal frequency division multiplexing (OFDM). In some embodiments, each of the time intervals in the periodically repeating set of time intervals includes one or more resource elements, where each resource element corresponds to a particular OFDM symbol and a particular frequency subcarrier or set of subcarriers within the OFDM symbol. In an embodiment, the base station 102-1 schedules communication between the base station 102-1 and the user devices 104-1, 104-2 by defining a periodically repeating set of time intervals, each time interval including one or more resource blocks, and then communicates with the user devices 104-1, 104-2 using allocated time intervals, within the periodically repeating set of time intervals, for communication with the user device 104-1, 104-2.

In an embodiment, the base stations 102-1 defines the periodically repeating set of time intervals for the user devices 104-1, 104-2 based, at least in part, on quality of the communication channel between the base station 102-1 and the user devices 104-1, 104-2 during the time intervals. For example, each of the user devices 104-1, 104-2 measures channel quality of the communication channel between the user device 104-1, 104-2 and the base station 102-1 during some or all of the time intervals, and reports the measured channel quality via feedback to the base station 102-1. In an embodiment, channel quality between the base station 102-1 and the user devices 104-1, 104-2 varies between the different time intervals in the set of time intervals. For example, channel quality of the communication channel between the user device 104-1 and the base station 102-1 during a particular time interval depends on the level of interference experienced by the user device 104-1 from other radio sources, such as neighboring base stations 102-2, 102-3 and/or neighboring user devices 104-3, 104-4 that operate in neighboring cells during the time intervals, in at least some embodiments. In other words, channel quality between the user device 104-1 and the base station 102-1 during a particular time interval depends, at least in part, on activity of other radio sources, in the vicinity of the user device 104-1, during the time interval, in an embodiment.

In an embodiment, the base station 102-1 receives, from each of the user devices 104-1, 104-2, information regarding channel quality of the respective communication channel between the base station 102-1 and each of the user devices 104-1, 104-2, and schedules communication with each of the user devices 104-1, 104-2 based at least in part on the channel quality information received from both of the user devices 104-1, 104-2. While the base station 102-1 bases scheduling decisions for a particular user device 104-1, 104-2 based on channel quality information received from both of the user devices 104-1, 1-4-2 served by the base station 102-1, the base station 102-1 is less likely to schedule communication between the base station 102-1 and a particular user device 104-1, 104-2 during a time interval of poor channel quality between the base station 102-1 and the particular user device 104-1, 104-2 and/or high levels of interference experienced by the particular user device 104-1, 104-2, in an embodiment.

In an embodiment, the user device 104-1 determines a set of one or more time intervals during which to at least suspend operation of the first network interface 106 and to enable operation of the second network interface 108 by selecting one or more time intervals, from set of periodically repeating time intervals defined by the first communication protocol, based a suitable selection criteria. In an embodiment, the selection criteria is based on channel quality of a communication channel between the user device 104-1 and the base station 102-1 and/or based on level of interference experienced by the first network interface 106, in an embodiment. For example, the user device 104-1 identifies one or more time intervals, from set of periodically repeating time intervals defined by the first communication protocol, that meet the selection criteria, and selects the one or more time intervals during which to suspend operation of the first network interface 106 by selecting some or all of the identified set of time intervals.

In an embodiment, the user device 104-1 obtains channel quality information, such as information indicative of level of interference experienced by the first network interface 106 of the user device 104-1 during one or more of the time intervals used for scheduling by the base station 102-1, and uses this channel quality information to allocate different ones of the time intervals, defined by the first communication protocol, for operation of the user device 104-1 according to the first communication protocol and the second communication protocol. For example, the user device 104-1 allocates time intervals corresponding to relatively good channel quality between the user device 104-1 and the base station 102-1 for operation of the first network interface 106 according to the first communication protocol, and allocates time intervals corresponding to relatively poor channel quality between the user device 104-1 and the base station 102-1 for operation of the second network interface 106 according to the second communication protocol, in an embodiment. For example, in an embodiment, during time intervals corresponding to relatively poor channel quality between the user device 104-1 and the base station 102-1, the communication device 104-1 at least substantially suspends operation of the first network interface 106 according to the first communication protocol, and enables operation of the second network interface 108 according to the second communication protocol, in an embodiment. In an embodiment, allocating different ones of the time intervals for operation according to the first and the second communication protocols eliminates interference that may be caused by concurrent operation of the user device 104-1 according to the first and the second communication protocols. Further, because the base station 102-1 is unlikely to schedule communication between the base station 102-1 and the user device 104-1 during the time intervals of relatively poor channel quality between the base station 102-1 and the user device 104-1, suspending operation of the first network interface 106 during the time intervals of relatively poor channel quality minimizes or eliminates loss of throughput caused by suspending operation of the first network interface 106, in at least some embodiments.

Figure 2:
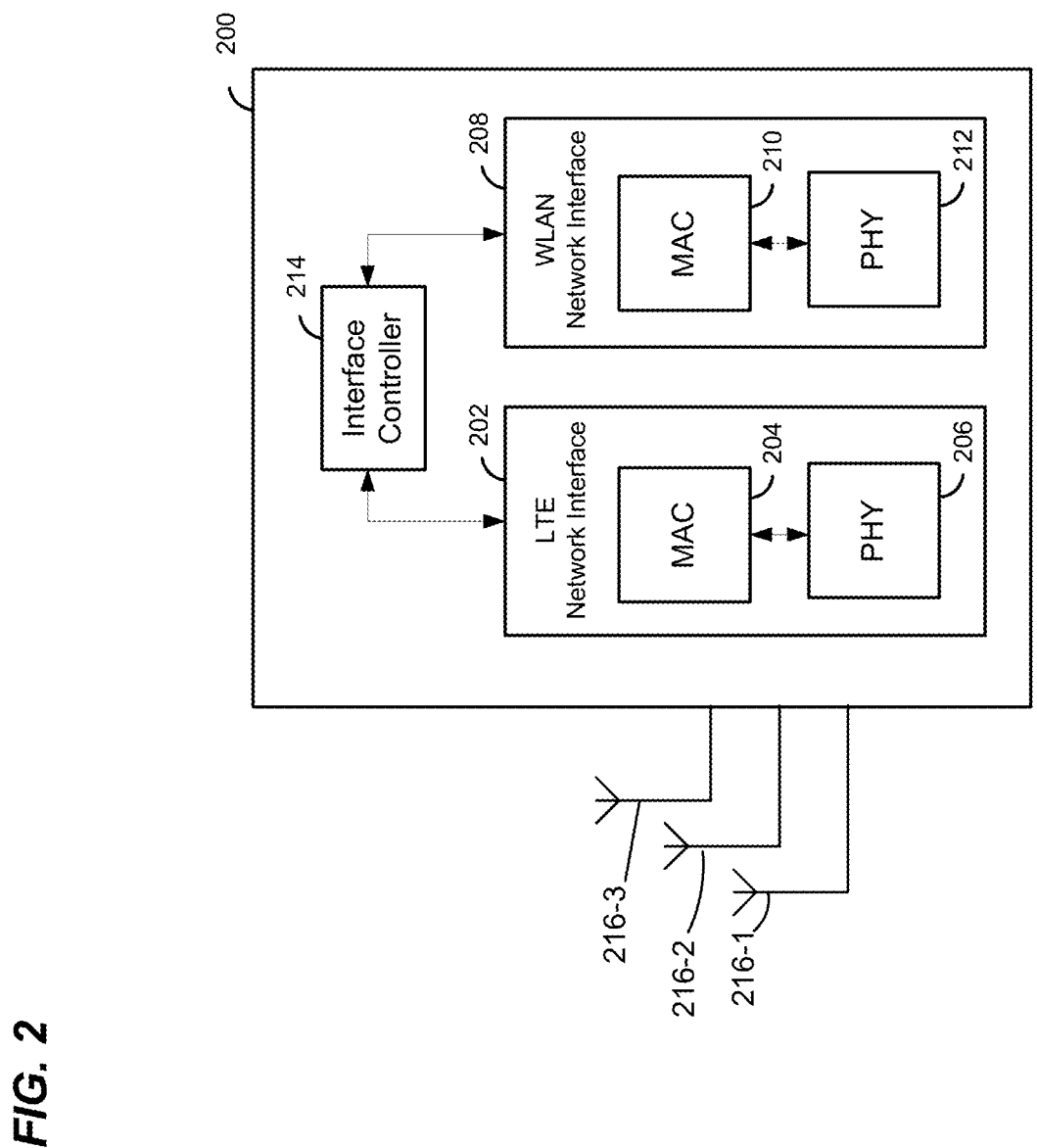
FIG. 2 is a block diagram of an example implementation of a communication device configured to operate using at least two different communication technologies that coexist within the communication device, according to an embodiment.

FIG. 2 is a block diagram of an example implementation of a communication device 200 configured to operate using at least two different communication technologies that coexist within the communication device 200, according to an embodiment. The communication device 200 includes a first network interface 202 configured to operate according to a first communication protocol and a second network interface 208 configured to operate according to a second communication protocol, in an embodiment. In an embodiment, the communication device 200 is used in the network 100 of FIG. 1.

For example, in an embodiment, the communication device 200 corresponds to the communication device 104-1 of FIG. 1. The network interface 202 corresponds to the network interface 106 of the user device 104-1, and the network interface 208 corresponds to the network interface 108 in FIG. 1, in this embodiment. In other embodiments, the communication device 200 is used in networks other than the example network 100 of FIG. 1. Similarly, communication devices configured to operate using at least two different communication technologies other than the communication device 200 are used in the network 100, in other embodiments.

With continued reference to FIG. 2, the first network interface 202 of the communication device 200 includes a physical layer (PHY) processing unit 204 and a medium access control (MAC) processing unit 206. The PHY processing unit 204 and the MAC processing unit 206 are configured to operate according to the first communication protocol. In an embodiment, the first communication protocol is a 3GPP LTE communication protocol. The PHY processing unit 204 is configured to transmit and receive data units configured according to the 3GPP LTE communication protocol, in this embodiment. The MAC processing unit 206 is configured to perform medium access control functions according to the 3GPP LTE communication protocol, in this embodiment.

The second network interface 208 of the communication device 200 includes a PHY processing unit 210 and a MAC processing unit 212. The PHY processing unit 210 and the MAC processing unit 212 are configured to operate according to the second communication protocol. In an embodiment, the second communication protocol is a WLAN communication protocol. The PHY processing unit 210 is configured to transmit and receive data units configured according to the WLAN communication protocol, in this embodiment. The MAC processing unit 212 is configured to perform medium access control functions according to the WLAN communication protocol, in this embodiment.

The communication device 200 includes an interface controller 214 coupled to the first network interface 202 and to the second network interface 208. The interface controller 214 is configured to control operation of the first network interface 202 and the second network interface 208 and to provide interference mitigation between the first network interface 202 and the second network interface 208, in an embodiment. For example, the controller 214 is configured to at least partially implement techniques described below to determine a set of one or more time intervals during which to suspend operation of the first network interface 202 and to enable operation of the second network interface 208, in an embodiment. Although the interface controller 214 is illustrated in FIG. 2 as being a component separate from the first network interface 202 and the second network interface 208, functionality of the interface controller 214 is at least partially included in the network interface 202 and/or in the network interface 208, in some embodiments.

The communication device 200 includes, or is coupled to, a plurality of antennas 216. Although three antennas 216 are shown in FIG. 2, the communication device 200 includes, or is coupled to, other suitable numbers of antennas 216 (e.g., 1, 2, 4, 5, 6, etc.), in other embodiments. Each of the network interfaces 202, 208 is coupled to respective one or more antennas 216, in an embodiment. In another embodiment, one or more antennas 216 are coupled to each one of the network interfaces 202, 208 and are shared by the interfaces 202, 208.

Figure 3:
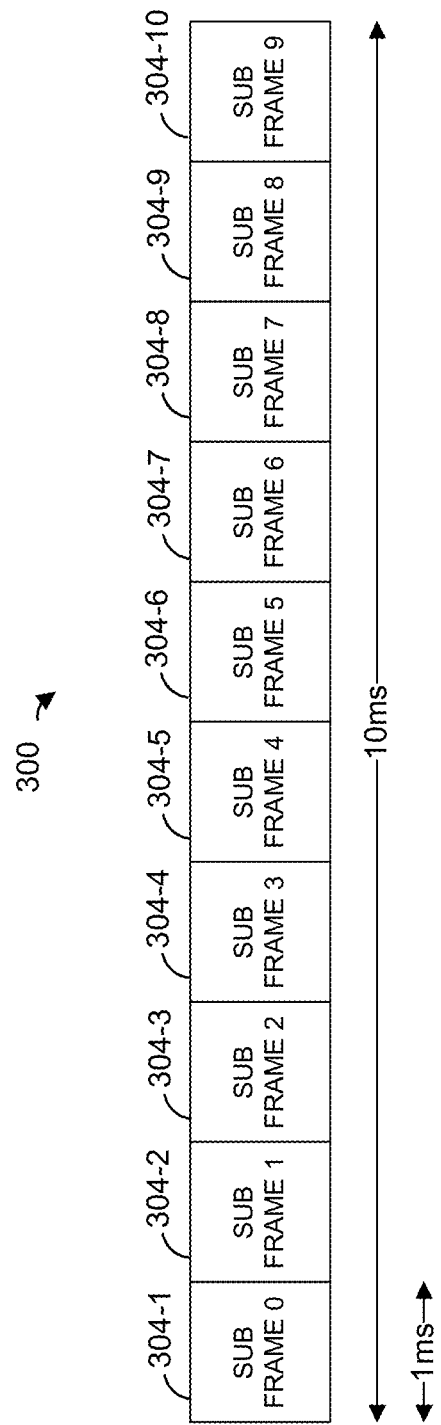
FIG. 3 is a diagram of an example frame, according to an embodiment.

FIG. 3 is a diagram of an example frame 300 structured according to the first communication protocol, according to an embodiment. The frame 300 includes a plurality of time intervals, or subframes, 304. In the embodiment of FIG. 3, the frame 300 is a 10 ms frame that includes ten 1 ms time intervals, or subframes, 304-1 to 304-9 (indicated in FIG. 3 as subframe 0 though subframe 9). The frame 300 includes another suitable numbers of time intervals fewer than or more than ten time intervals, in other embodiments. In an embodiment, the base station 102-1 determines a scheduling pattern for the user device 104-1 by scheduling communication with the user device 104-1 in one or more of the subframes 304 within the frame 300. The scheduling pattern defined by the base station 102-1 for the frame 300 persists for a certain number of frames that follow the frame 300, in an embodiment. Accordingly, the scheduling pattern defined for the frame 300 defines a repeating set of time intervals, or subframes, 304 that repeats with a period equal to the length of the frame 300 (e.g., repeats every 10 ms), in this embodiment. The first communication protocol defines suitable time intervals other than the example time intervals 304, and the base station 102-1 utilizes the other suitable time intervals other than the example time intervals 304 to define a scheduling pattern for communication with the user device 104-1, in some embodiments.

In an embodiment, the base station 102-1 schedules communication with the user device 104-1 by scheduling downlink transmissions to the user device 104-1 and/or uplink transmissions from the user device 104-1 within certain ones of the subframes 304. Accordingly, in an embodiment, one or more of the subframes 304 are scheduled for communication with the user device 104-1 and may include data for the user device 104-1 and/or may allow transmission of data by the user device 104-1, while the remaining one or more subframes 304 are not scheduled for communication with the user device 104-1 and, accordingly, do not include data for the user device 104-1 and do not allow transmissions by the user device 104. In an embodiment, the base station 102-1 determines the scheduling pattern for the user device 104-1 based on various information regarding quality of the communication channel between the base station 102-1 and the user device 104-1 and/or levels of interference experienced by the network interface 106 of the user device 104-1 from other radio sources in the vicinity of the user device 104-1 during different subframes 304. For example, the base station 102-1 is unlikely to schedule, for communication with the user device 104-1, those subframe 304 that correspond to time intervals of relatively low channel quality between the base station 102-1 and the user device 104-1 and/or relatively high levels of interference experienced by the network interface 106 of the user device 104-1, in an embodiment.

In an embodiment, the user device 104-1 is configured to determine a set of one or more subframes 304 during which to at least substantially suspend operation of the first network interface 106 according to the first communication protocol and to enable operation of the second network interface 108 to allow operation of the user device 104-1 according to the second communication protocol. In effect, the user device 104-1 is configured to "puncture" the determined set of one or more subframes 304 with respect to operation of the user device 104-1 according to the first communication protocol, in this embodiment. In an embodiment, the user device 104-1 selects one or more subframes 304 that correspond to time intervals of relatively low channel quality between the base station 102-1 and the user device 104-1 and/or high levels of interference experienced by the network interface 106 of the user device 104-1 as the set of one or more subframes 304 to be punctured with respect to operation of the first network interface 106.

In an embodiment, the base station 102-1 does not, in advance, notify the user device 104-1 of which ones of the subframes 304 are, or are not, scheduled for communication with the user device 104-1. Accordingly, the user device 104-1 does not know whether a particular subframe 304 includes data for the user device 104 and/or allows transmission by the user device 104-1 prior having received at least a portion of the particular subframe 304, in this embodiment. For example, in an embodiment, the base station 102-1 transmits an indication of whether a particular subframe 304 includes data for the user device 104-1 in a beginning portion of the subframe 304. Thus, the user device 104-1 is configured to receive and process at least the beginning portion of each of the subframes 304 to determine whether or the subframe 304 includes data for the user device 104-1, in an embodiment. In another embodiment, however, the base station 102-1 notifies the user device 104-1 of which ones of the subframes 304 are not scheduled for communication device 104-1 after a period of negotiation with the user device 104-1 during which the base station 102-1 negotiates a scheduling pattern with the user device 104-1.

In an embodiment, the user device 104-1 at least substantially suspends operation of the first network interface 106 for the entire duration of each subframe 304 in the set of subframes 304 punctured with respect to operation of the user device 104-1 according to the first communication protocol. Thus, the user device 104-1 does not receive even the beginning portions of these punctured subframes 304 and does not know whether or not the punctured subframes 304 include data for the user device 104-1, at least during the time period in which the scheduling pattern is being negotiated between the base station 102-1 and the user device 104-1, in this embodiment. However, because the base station 102-1 is unlikely to schedule these punctured subframes 304 for communication with the user device 104-1, selecting these subframes 304 as the set of subframes during which to suspend operation of the first network interface 106 minimizes or eliminates loss of throughput in the first network interface 106, in at least some embodiments.

In some embodiments, the user device 104-1 is configured to perform various channel measurements related to network management functions defined by the first communication protocol, and to determine the set of one or more subframes 304 to be punctured with respect to operation of the user device 104-1 according to the first communication protocol at least partially based on such network management related channel measurements. For example, in an embodiment, the user device 104-1 is configured to perform various network coordination measurements, such as radio resource management (RRM) measurements and/or radio link management (RLM) measurements defined by the first communication protocol. For example, the user device 104-1 performs an RRM measurement in which the user device 104-1 measures power level and/or signal quality of a user specific reference signal transmitted to the user device 104-1 from the base station 102-1, in an embodiment and/or scenario. In another embodiment and/or scenario, the user device 104-1 performs a RLM measurement in which the network interface 106 measures power level and/or signal quality of a cell specific reference signal transmitted by the base station 102-1.

In some embodiments, the user device 104-1 provides one or more of (i) measured user-specific reference signal power level, (ii) measured user specific reference signal quality, (iii) measured cell specific reference signal power level, and (iv) measured cell specific reference signal quality via feedback to the base station 102-1. Additionally or alternatively, the user device 104-1 determines channel state information (CSI), such as channel state information, which may include measured signal to noise based on one or more reference signals (e.g., pilot signals) received from the base station 102-1, in an embodiment. In some embodiments, the user device 104-1 provides channel state information via feedback to the base station 102-1 in addition to or instead of providing RRM and/or RLM measurements via feedback to the base station 102-1. The base station 102-1 utilizes RRM and/or RLM and/or CSI feedback from the user device 104-1 for performing various network management functions, such as scheduling of resource elements for the user device 104-1, scheduling of resource elements for other user devices 104 served by the base station 102-1, facilitating inter cell interference avoidance for the user devices 104 served by the base station 102-1, initiating handover procedures for the user device 104-1, etc., in some embodiments.

In some embodiments, the user device 104-1 utilizes the measured RRM, RLM and/or CSI information corresponding to some or all of the subframes 304 to determine a set of one or more subframes 304 during which to suspend operation of the first network interface 106 and to enable operation of the second network interface 108 to allow the user device 104-1 to operate according to the second communication protocol. For example, the user device 104-1 identifies a set of one or more subframes 304 associated with poor channel quality according to the RRM, RLM and/or CSI measurements obtained by the network interface 106, in an embodiment. For example, the user device 104-1 identifies a set of one or more subframes 304 for which the SNR, or the SINR, is below a certain threshold. As another example, the user device 104-1 determines an average SNR, or an average SINR, over the subframes 304 during which the channel quality measurements were taken, and identifies a set of one or more subframes 304 for which the SNR, or the SINR, is lower than the average SNR, or average SINR by a certain amount, in another embodiment. In an embodiment, the user device 104-1 utilizes the indentified set of one or more subframes 304 as the set of set of one or more subframes 304 during which to suspend operation of the first network interface 106 and to enable operation of the second network interface 108 to allow the user device 104-1 to operate according to the second communication protocol.

In an embodiment, the user device 104-1 is configured to perform network management measurements, such as the RRM/RLM/CSI measurements discussed above, in response to receiving a message, such as a radio resource control (RRC) message, from the base station 102-1. In an embodiment, the RRC message indicates to the user device 104-1 one or more restricted measurement sets of subframes 304 used, for example, for enhanced inter cell interference coordination (eICIC) procedures defined by the first commutation protocol (e.g., as defined by the 3GPP Release 10 and beyond communication protocols). In an embodiment, an RRC message sent from the base station 102-1 to the user device 104-1 indicates a set of one or more subframes 304 during which various network management measurements are to be performed by user device 104-1. For example, an RRC message indicates a subset of the subframes 304 during which the user device 104-1 is to perform RRM and/or RLM measurements based on reference signals received by the user device 104-1 from the base station 102-1. The subset of subframes during which the user device 104-1 is to perform RRM and/or RLM measurements based on reference signals received from the base station 102-1 corresponds to a subset of subframes 304 for which the base station 102-1 is likely to schedule communication with the user device 104-1, in an embodiment. Accordingly, the user device 104-1 selects the set of one or more subframes 304 to be punctured with respect to operation of the user device 104-1 according to the first communication protocol from a set of subframes 304 that excludes the indicated subset of subframes 304, in an embodiment.

In another embodiment, an RRC message sent from the base station 102-1 to the user device 104-1 indicates a subset of subframes 304 during which the user device 104-1 is to perform RRM and/or RLM measurements based on reference signals transmitted by neighboring base stations, such as the base station 102-2 and/or the base station 102-3. In an embodiment, the subset of subframes 304 during which the user device 104-1 is to perform RRM and/or RLM measurements based on reference signals transmitted by neighboring base stations corresponds to a subset of subframes 304 for which the base station 102-1 is not likely to schedule communication with the user device 104-1. For example, the subset of subframes 304 during which the user device 104-1 is to perform RRM and/or RLM measurements based on reference signals transmitted by neighboring base stations 102 corresponds to a subset of subframes 304 during which the base station 102-1 expects the user device 104-1 to experience relatively high levels of interference from the neighboring base stations 102, in an embodiment. Accordingly, the user device 104-1 selects the subset of subframes 304 during which the user device 104-1 is to perform RRM and/or RLM measurements based on reference signals transmitted by neighboring base stations 102 as the set of subframes 304 to be punctured with respect to operation of the user device 104-1 according to the first communication protocol, in an embodiment.

In yet another embodiment, an RRC message sent from the base station 102-1 to the user device 104-1 indicates multiple subsets of subframes 304 during which the user device 104-1 is to is to perform RRM and/or RLM measurements based on reference signals transmitted by neighboring base stations, such as the base station 102-2 and/or the base station 102-3. For example, the RRC message indicates a first subset of one or more subframes 304 and a second subset of one or more subframes 304 during which the user device 104-1 is to perform RRM and/or RLM measurements based on reference signals transmitted by neighboring base stations, in an embodiment. In this case, the user device 104-1 performs the RRM and/or RLM measurements during the subframes 304 in the first subset of one or more subframes 304 to obtain a first channel measure, and performs the RRM and/or RLM measurements during the subframes 304 in the second subset of one or more subframes 304 to obtain a second channel measure. The user device 104-1 then compares the first channel measure and the second channel measure, and, based on the comparison, selects either the first subset of one or more subframes 304 or the second subset of one or more subframes 304 as the set of subframes 304 to be punctured with respect to operation of the user device 104-1 according to the first communication protocol, in an embodiment. For example, the user device 104-1 selects the first subset of one or more subframes 304 when the first channel measure indicates a relatively higher level of interference experienced by the network interface 106, and selects the second subset of one or more subframes 304 when the second channel measure indicates a relatively higher level of interference experienced by the network interface 106, in an embodiment.

In some embodiments, the user device 104-1 performs channel measurements independent of any specific measurements, such as network management related measurements, defined the first communication protocol and/or performs channel measurements independent of any specific instructions received from the base station 102-1. For example, the user device 104-1 measures the communication channel between the user device 104-1 and the base station 102-1 during each of some or all of the subframes 304 to obtain a measure of the channel during each of the some or all of the subframes 304. The user device 104-1 then selects one or more subframes 304 corresponding to relatively poor channel quality, such as one or more subframes 304 associated with an estimated SNR, or estimated SINR, above a certain threshold, as the set of subframes to be punctured with respect to operation of the user device 104-1 according to the first communication protocol, in an embodiment. As another example, the user device 104-1 performs co-channel interference detection, using a suitable co-channel interference detection technique, to detect interference cased, for example, by neighboring base stations 102 and/or neighboring user devices 104, in some or all of the subframes 304, in an embodiment. The user device 104-1 then selects one or more subframes 304 corresponding to relatively high levels of detected interference as the set of subframes to be punctured with respect to operation of the user device 104-1 according to the first communication protocol, in an embodiment.

Figure 4:
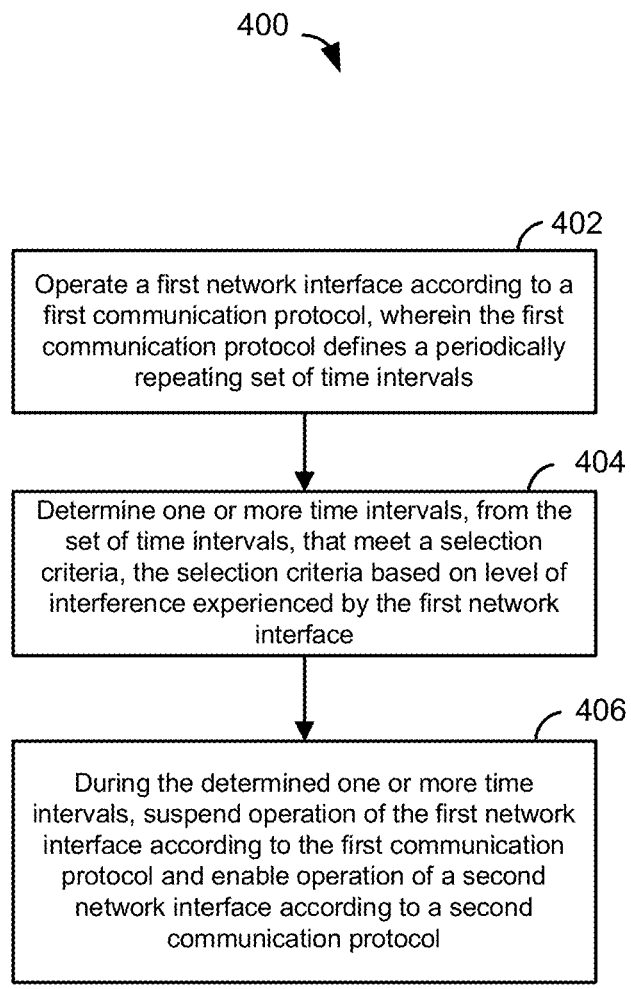
FIG. 4 is a flow diagram of an example method of operating a communication device configured to utilize multiple wireless communication technologies, according to an embodiment.

FIG. 4 is a flow diagram of an example method 400 of operating a communication device configured to operate according to a first communication protocol and a second communication protocol, according to an embodiment. With reference to FIG. 1, the method 400 is implemented by the user device 104-1, according to an embodiment. With reference to FIG. 2, the method 400 is implemented by the communication device 200, in an embodiment. For example, the method 400 is implemented at least partially by the controller 214 of the network device 200, in an embodiment. In other embodiments, the method 400 is implemented by other suitable communication devices. For ease of explanation, the method 400 is described below as being implemented by the communication device 104-1 of FIG. 1.

At block 402, the communication device operates a first network interface according to the first communication protocol. For example, at block 402, the user device 104-1 operates the first network interface 104-1 according to the first communication protocol. In an embodiment, the first communication protocol is a 3GPP LTE communication protocol. In another embodiment, the first communication protocol is another suitable communication protocol. In an embodiment, the first communication protocol defines a periodically repeating set of time intervals for scheduling communication according to the first communication protocol. In an embodiment, the time intervals correspond to subframes of a frame during which communication is scheduled for one or more communication devices. For example, the time intervals correspond to the subframes 304 of FIG. 3, in an embodiment. In another embodiment, the other suitable periodically repeating time intervals are used.

At block 404, the communication device determines one or more time intervals that meet a selection criteria based on a level of interference experienced by the first network interface. The selection criteria is based, for example, on measured channel quality, of the communication channel between the communication devices and a base station that serves the communication device, during some or all of the time intervals, in an embodiment. In another embodiment, the selection criteria is based on measured interference level experienced by the first network interface during some or all of the time intervals. In an embodiment, the selection criteria is based on a message, such as a radio resource control (RRC) message, received form a base station that serves the communication device. For example, the message indicates one or more subsets of the time intervals, and the communication device selects the one or more time intervals based on whether or not the one or more time intervals are included in the one or more indicated subsets of the time intervals. In another embodiment, the one or more time intervals are determined without any specific input from a base station.

At block 406, during the one or more time intervals determined at block 404, the communication device suspends operation of the first network interface according to the first communication protocol and enables operation of a second network interface according to the second communication protocol. For example, at block 406, the user device 104-1 suspends operation of the first network interface 106 according to the first communication protocol, and enables operation of the second network interface 108 according to the second communication protocol. In an embodiment, the second communication protocol is one of a WLAN communication protocol, a Bluetooth communication protocol, GPS communication protocol. In another embodiment, the second communication protocol is another suitable communication protocol. In an embodiment, a base station that operates according to the first communication protocol is unlikely to schedule communication for the communication device during the time intervals of high interference experienced by the first network interface of the communication device. Accordingly, suspending operation of the first network interface during the one or more time intervals determined at block 404 minimizes or eliminates loss of throughput caused by suspending operation of the first network interface, in at least some embodiments.

In an embodiment, a method of operating a communication device that includes at least (i) a first network interface configured to operate according to a first communication protocol and (ii) a second network interface configured to operate according to a second communication protocol. The method includes operating the first communication interface according to the first communication protocol, wherein the first communication protocol defines a periodically repeating set of time intervals. The method also includes determining one or more time intervals, from the set of time intervals, that meet a selection criteria, wherein the selection criteria is based on level of interference experienced by the first network interface. The method additionally includes, during the determined one or more time intervals, suspending operation of the first network interface according to the first communication protocol, and enabling operation of the second network interface according to the second communication protocol.

In other embodiments, the method includes any combination of one or more of the following features.

The first communication protocol is a $3^{rd}$ Partnership Project Long Term Evolution (3GPP LTE) protocol.

The second communication protocol is one of a wireless local area network (WLAN) communication protocol, a Bluetooth communication protocol, or a global positioning system (GPS) communication protocol.

The communication device is served by a serving base station, and wherein the selection criteria is based on level of interference that the first network interface experiences as a result of transmissions by one or more neighboring base stations.

Determining the one or more time intervals comprises performing channel measurements during one or more of the plurality of time intervals to identify a subset of time intervals, of the plurality of time intervals, that correspond to low channel quality of a communication channel between the communication device and a serving base station, and selecting the one or more time intervals from the identified subset time intervals.

Performing channel measurements during the one or more time intervals includes performing one or more of i) a signal to noise ratio (SNR) measurement based on a reference signal received from the serving base station, and ii) signal and interference to noise ratio (SINR) measurement based on the reference signal received from the serving base station.

Performing channel measurements during the one or more time intervals comprises performing co-channel interference detection measurements during the one or more time intervals.

Determining the one or more time intervals comprises receiving, at the communication device from a serving base station, a radio resource management (RRM) message, wherein the RRM message indicates a subset of the plurality of time intervals during which the communication device is to measure a communication channel between the communication device and the serving base station, and selecting the one or more time intervals from the time intervals, of the plurality of time intervals, that are excluded from the subset of time intervals.

Determining the one or more time intervals comprises receiving, at the communication device from a serving base station, a radio resource management (RRM) message, wherein the RRM message indicates a subset of the plurality of time intervals during which the communication device is to measure a communication channel between the communication device and a neighboring base station, and selecting the one or more time intervals from the time intervals, of the plurality of time intervals, that are included in the subset of time intervals.

Determining the one or more time intervals comprises receiving, at the communication device from a serving base station, a radio resource management (RRM) message, wherein the RRM message indicates a first subset of time intervals of the plurality of time intervals and a second subset of time intervals of the plurality of time intervals, wherein the first subset and the second subset indicate respective subsets of time intervals during which the communication device is to measure a communication channel between the communication device and a neighboring base station.

Determining the one or more time intervals further comprises performing channel measurements during the first subset of time intervals to determine a first channel measure corresponding to the first subset of time intervals, and performing channel measurements during the second restricted set of time intervals to determine a second channel measure corresponding to the second subset of time intervals.

Determining the one or more time intervals further comprises selecting the first subset as the one or more time intervals if the first channel measure indicates worse channel quality compared to channel quality indicated by the second channel measure, and selecting the second subset as the one or more time intervals if the first channel measure indicates worse channel quality compared to channel quality indicated by the second channel measure.

In another embodiment, an apparatus comprises a communication device having (i) a first network interface configured to operate according to a first communication protocol and (ii) a second network interface configured to operate according to a second communication protocol. The communication device is configured to operate the first communication interface according to the first communication protocol, wherein the first communication protocol defines a periodically repeating set of time intervals. The communication device is also configured to determine one or more time intervals, from the set of time intervals, that meet a criteria for a high level of interference experienced by the first network interface. The communication is additionally configured to, during the determined one or more time intervals, suspend operation of the first network interface according to the first communication protocol, and enable operation of the second network interface according to the second communication protocol.

In other embodiment, the apparatus further comprises any combination of one or more of the following features.

The first communication protocol is a $3^{rd}$ Partnership Project Long Term Evolution (3GPP LTE) protocol.

The second communication protocol is one of a wireless local area network (WLAN) communication protocol, a Bluetooth communication protocol, or a global positioning system (GPS) communication protocol.

The communication device is served by a serving base station, and wherein the selection criteria is based on level of interference that the first network interface experiences as a result of transmissions by one or more neighboring base stations.

The communication device is further configured to perform channel measurements during one or more of the plurality of time intervals to identify a subset of time intervals, of the plurality of time intervals, that correspond to low channel quality of a communication channel between the communication device and a serving base station, and select the one or more time intervals from the identified subset time intervals.

The communication device is configured to perform channel measurements during the one or more time intervals by measuring one or more of i) a signal to noise ratio (SNR) based on a reference signal received from the serving base station, and ii) signal and interference to noise ratio (SINR) based on the reference signal received from the serving base station.

The communication device is configured to perform channel measurements during the one or more time intervals by performing co-channel interference detection measurements during the one or more time intervals.

The communication device is further configured to receive, from a serving base station, a radio resource management (RRM) message, wherein the RRM message indicates a subset of the plurality of time intervals during which the communication device is to measure a communication channel between the communication device and the serving base station, and determine the one or more time intervals by selecting the one or more time intervals from the time intervals, of the plurality of time intervals, that are excluded from the subset of time intervals.

The communication device is further configured to receive, from a serving base station, a radio resource management (RRM) message, wherein the RRM message indicates a subset of the plurality of time intervals during which the communication device is to measure a communication channel between the communication device and a neighboring base station, and determine the one or more time intervals by selecting the one or more time intervals from the time intervals, of the plurality of time intervals, that are included in the subset of time intervals.

The communication device is further configured to receive, from a serving base station, a radio resource management (RRM) message, wherein the RRM message indicates a first subset of time intervals of the plurality of time intervals and a second subset of time intervals of the plurality of time intervals, wherein the first subset and the second subset indicate respective subsets of time intervals during which the communication device is to measure a communication channel between the communication device and a neighboring base station.

The communication is further configured to perform channel measurements during the first subset of time intervals to determine a first channel measure corresponding to the first subset of time intervals, and perform channel measurements during the second restricted set of time intervals to determine a second channel measure corresponding to the second subset of time intervals.

The communication is further configured to select, as the determined one or more time intervals, the first subset as the one or more time intervals if the first channel measure indicates worse channel quality compared to channel quality indicated by the second channel measure, and select, as the determined one or more time intervals, the second subset as the one or more time intervals if the first channel measure indicates worse channel quality compared to channel quality indicated by the second channel measure.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the scope of the invention.

What is claimed is:

1. A method of operating a communication device that includes at least (i) a first network interface configured to communicate in a first network according to a first communication protocol with a serving base station, and (ii) a second network interface configured to communicate in a second network according to a second communication protocol, the method comprising:
    operating the first network interface according to the first communication protocol, wherein the first communication protocol defines a periodically repeating frame including a set of time intervals;
    predicting, at the communication device, one or more time intervals, among the set of time intervals, in which the serving base station will not transmit to the communication device because of interference caused by transmissions by other communication devices in one or more third networks, when the communication device does not yet know whether the serving base station will transmit data to the communication device during any of the one or more time intervals, wherein predicting the one or more time intervals includes at least one of i) measuring channel quality in the one or more time intervals to determine whether interference caused by transmissions by other communication devices in the one or more third networks is occurring, and ii) analyzing instructions from the serving base station regarding channel quality measurements that are to be reported by the communication device, wherein the analyzing the instructions includes determining particular time intervals in the frame for which the serving base station is requesting channel quality measurements; and
    in response to predicting, at the communication device, the one or more time intervals when the communication device does not yet know whether the serving base station will transmit data to the communication device during any of the one or more time intervals,
        suspending operation of the first network interface according to the first communication protocol during the one or more time intervals, and
        enabling operation of the second network interface according to the second communication protocol during the one or more time intervals.

2. The method of claim 1, wherein the first communication protocol is a $3^{rd}$ Generation Partnership Project Long Term Evolution (3GPP LTE) protocol.

3. The method of claim 2, wherein the second communication protocol is one of a wireless local area network (WLAN) communication protocol, a Bluetooth communication protocol, or a global positioning system (GPS) communication protocol.

4. The method of claim 1, wherein predicting the one or more time intervals includes measuring a level of interference that the first network interface experiences as a result of transmissions by one or more neighboring base stations.

5. The method of claim 1, wherein predicting the one or more time intervals comprises:
    performing channel measurements during one or more of the plurality of time intervals to identify a subset of time intervals, of the plurality of time intervals, that correspond to low channel quality of a communication channel between the communication device and the serving base station; and
    selecting the one or more time intervals from the identified subset time intervals.

6. The method of claim 5, wherein performing channel measurements during the one or more time intervals includes performing one or more of i) a signal to noise ratio (SNR) measurement based on a reference signal received from the serving base station, and ii) signal and interference to noise ratio (SINR) measurement based on the reference signal received from the serving base station.

7. The method of claim 5, wherein performing channel measurements during the one or more time intervals comprises performing co-channel interference detection measurements during the one or more time intervals.

8. The method of claim 1, wherein predicting the one or more time intervals comprises:
    receiving, at the communication device from the serving base station, a radio resource management (RRM) message, wherein the RRM message indicates a subset of the plurality of time intervals during which the communication device is to measure a communication channel between the communication device and the serving base station, and selecting the one or more time intervals from the time intervals, of the plurality of time intervals, that are excluded from the subset of time intervals.

9. The method of claim 1, wherein predicting the one or more time intervals comprises:

receiving, at the communication device from the serving base station, a radio resource management (RRM) message, wherein the RRM message indicates a subset of the plurality of time intervals during which the communication device is to measure a communication channel between the communication device and a neighboring base station, and selecting the one or more time intervals from the time intervals, of the plurality of time intervals, that are included in the subset of time intervals.

10. The method of claim 1, wherein predicting the one or more time intervals comprises:

receiving, at the communication device from the serving base station, a radio resource management (RRM) message, wherein the RRM message indicates a first subset of time intervals of the plurality of time intervals and a second subset of time intervals of the plurality of time intervals, wherein the first subset and the second subset indicate respective subsets of time intervals during which the communication device is to measure a communication channel between the communication device and a neighboring base station, performing channel measurements during the first subset of time intervals to determine a first channel measure corresponding to the first subset of time intervals;

performing channel measurements during the second restricted set of time intervals to determine a second channel measure corresponding to the second subset of time intervals, selecting the first subset as the one or more time intervals if the first channel measure indicates worse channel quality compared to channel quality indicated by the second channel measure, and selecting the second subset as the one or more time intervals if the second channel measure indicates worse channel quality compared to channel quality indicated by the first channel measure.

11. An apparatus, comprising a communication device having (i) a first network interface configured to communicate in a first network according to a first communication protocol with a serving base station, and (ii) a second network interface configured to communicate in a second network according to a second communication protocol, wherein the communication device is configured to:

operate the first network interface according to the first communication protocol, wherein the first communication protocol defines a periodically repeating set of time intervals;

predict one or more time intervals, among the set of time intervals, in which the serving base station will not transmit to the communication device because of interference caused by transmissions by other communication devices in one or more third networks, when the communication device does not yet know whether the serving base station will transmit data to the communication device during any of the one or more time intervals, wherein predicting the one or more time intervals includes at least one of i) measuring channel quality in the one or more time intervals to determine whether interference caused by transmissions by other communication devices in the one or more third networks is occurring, and ii) analyzing instructions from the serving base station regarding channel quality measurements that are to be reported by the communication device, wherein the analyzing the instructions includes determining particular time intervals in the frame for which the serving base station is requesting channel quality measurements; and in response to predicting, at the communication device, the one or more time intervals when the communication device does not yet know whether the serving base station will transmit data to the communication device during any of the one or more time intervals, suspend operation of the first network interface according to the first communication protocol during the one or more time intervals, and enable operation of the second network interface according to the second communication protocol during the one or more time intervals.

12. The apparatus of claim 11, wherein the first communication protocol is a $3^{rd}$ Generation Partnership Project Long Term Evolution (3GPP LTE) protocol.

13. The apparatus of claim 11, wherein the second communication protocol is one of a wireless local area network (WLAN) communication protocol, a Bluetooth communication protocol, or a global positioning system (GPS) communication protocol.

14. The apparatus of claim 11, predicting the one or more time intervals includes measuring a level of interference that the first network interface experiences as a result of transmissions by one or more neighboring base stations.

15. The apparatus of claim 11, wherein the communication device is further configured to:

perform channel measurements during one or more of the plurality of time intervals to identify a subset of time intervals, of the plurality of time intervals, that correspond to low channel quality of a communication channel between the communication device and a serving base station; and select the one or more time intervals from the identified subset time intervals.

16. The apparatus of claim 15, wherein the communication device is configured to perform channel measurements during the one or more time intervals by measuring one or more of i) a signal to noise ratio (SNR) based on a reference signal received from the serving base station, and ii) signal and interference to noise ratio (SINR) based on the reference signal received from the serving base station.

17. The apparatus of claim 15, wherein the communication device is configured to perform channel measurements during the one or more time intervals by performing co-channel interference detection measurements during the one or more time intervals.

18. The apparatus of claim 11, wherein the communication device is further configured to:

receive, from the serving base station, a radio resource management (RRM) message, wherein the RRM message indicates a subset of the plurality of time intervals during which the communication device is to measure a communication channel between the communication device and the serving base station, and determine the one or more time intervals by selecting the one or more time intervals from the time intervals, of the plurality of time intervals, that are excluded from the subset of time intervals.

19. The apparatus of claim 11, wherein the communication device is further configured to:
- receive, from the serving base station, a radio resource management (RRM) message, wherein the RRM message indicates a subset of the plurality of time intervals during which the communication device is to measure a communication channel between the communication device and a neighboring base station, and
- determine the one or more time intervals by selecting the one or more time intervals from the time intervals, of the plurality of time intervals, that are included in the subset of time intervals.

20. The apparatus of claim 11, wherein the communication device is further configured to:
- receive, from the serving base station, a radio resource management (RRM) message, wherein the RRM message indicates a first subset of time intervals of the plurality of time intervals and a second subset of time intervals of the plurality of time intervals, wherein the first subset and the second subset indicate respective subsets of time intervals during which the communication device is to measure a communication channel between the communication device and a neighboring base station,
- perform channel measurements during the first subset of time intervals to determine a first channel measure corresponding to the first subset of time intervals;
- perform channel measurements during the second restricted set of time intervals to determine a second channel measure corresponding to the second subset of time intervals, and
- select, as the predicted one or more time intervals, the first subset as the one or more time intervals if the first channel measure indicates worse channel quality compared to channel quality indicated by the second channel measure, and
- select, as the predicted one or more time intervals, the second subset as the one or more time intervals if the second channel measure indicates worse channel quality compared to channel quality indicated by the first channel measure.

\* \* \* \* \*